Aug. 27, 1968
M. H. GROVE ET AL
3,398,761
VALVE LEAKAGE DETECTOR
Filed May 9, 1966
2 Sheets-Sheet 1
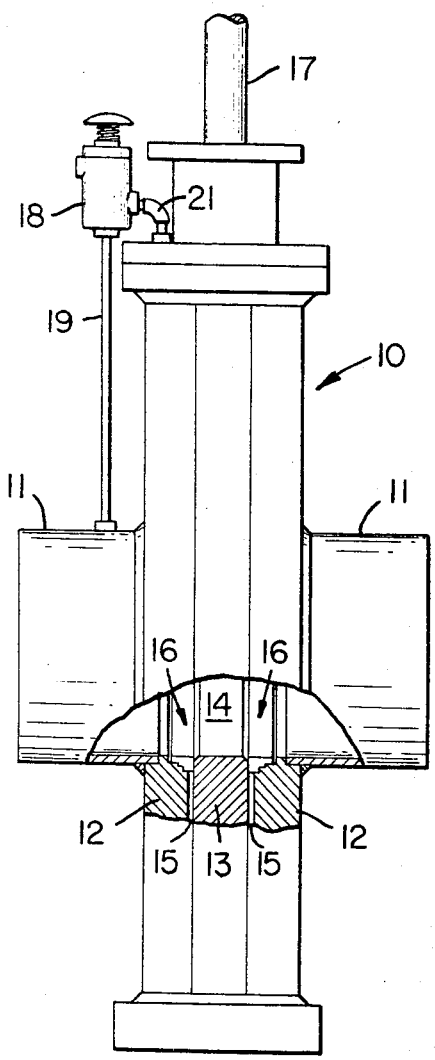
FIG_1
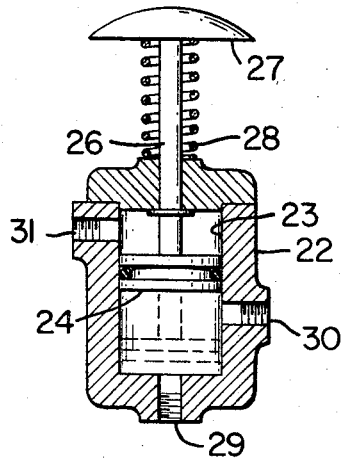
FIG_2
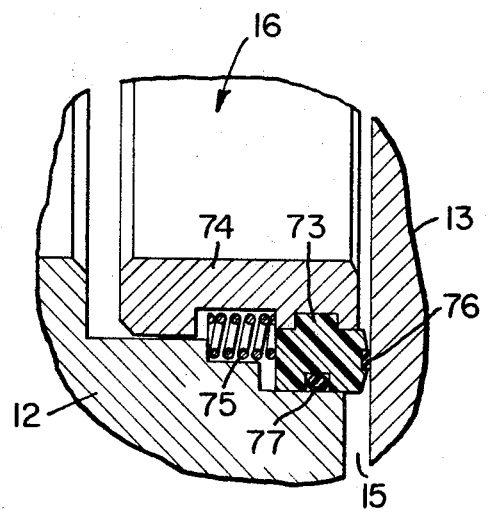
FIG_6
INVENTORS
MARVIN H. GROVE
LYLE R. VAN ARSDALE
BY
ATTORNEYS Aug. 27, 1968   M. H. GROVE ET AL   3,398,761
VALVE LEAKAGE DETECTOR
Filed May 9, 1966   2 Sheets-Sheet 2
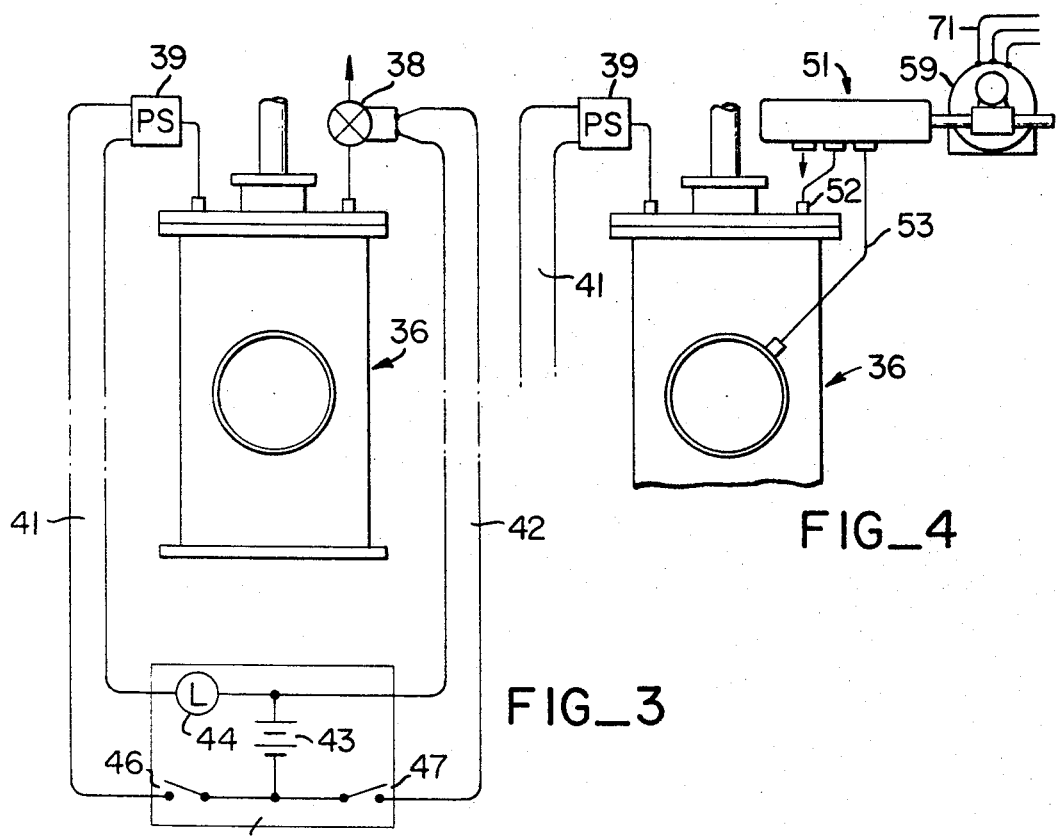
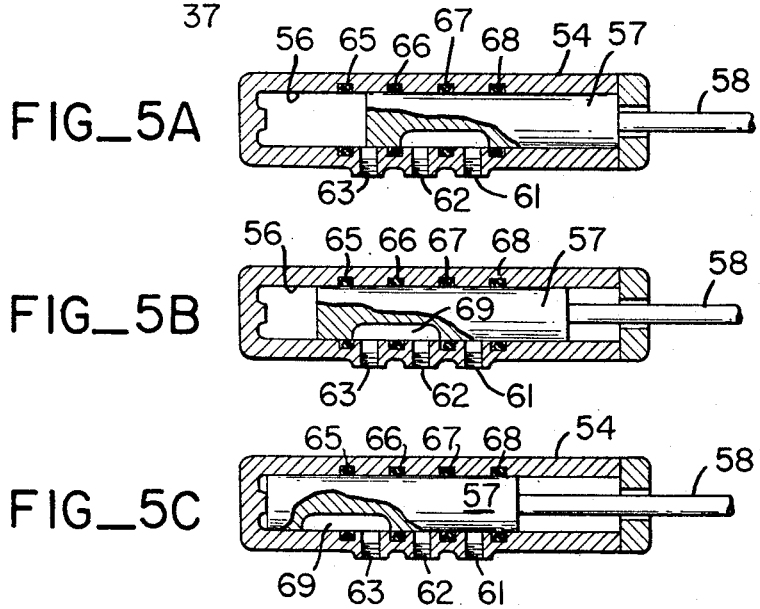
INVENTORS
MARVIN H. GROVE
LYLE R. VAN ARSDALE
BY
ATTORNEYS United States Patent Office 3,398,761
Patented Aug. 27, 1968

3,398,761
VALVE LEAKAGE DETECTOR
Marvin H. Grove, Piedmont, Calif., and Lyle R. Van Arsdale, Houston, Tex., assignors to M&J Valve Company, Houston, Tex., a corporation of Delaware
Filed May 9, 1966, Ser. No. 548,724
8 Claims. (Cl. 137—312)

ABSTRACT OF THE DISCLOSURE

A leakage detector for valves of the type having sealing means surrounding the inlet and outlet valve flow passages. A vent valve connects with the closed body space of the valve and is operated to vent the body space to atmosphere. A means serves to detect any leakage of line fluid into the body space, immediately after such venting.

This invention relates generally to valve apparatus such as is employed in conjunction with petroleum transmission pipe lines or so-called meter provers. More particularly, it pertains to apparatus for quickly checking to determine if a valve is leaking.

In various industrial systems where valves are installed to control liquid flow, it is important to provide a tight shut-off and to be able to check a particular valve to determine if it is leaking. Particular reference can be made to petroleum pipeline transmission systems where one or more liquid petroleum products may be handled through the line. Also reference may be made to so-called meter prover equipment where leakage of a valve may seriously interfere with metering accuracy. In the past, valves have been checked by so-called block-and-bleed operations. This has reference to venting the body space of a valve to determine if leakage is occurring through the upstream seal. Block-and-bleed testing is commonly carried out by providing a simple manually operated valve connected to the body space and which can be opened to vent the body. While block-and-bleed operations are effective to determine leakage past the upstream seal, it leaves the valve in a condition in which fluid pressure is acting upon the upstream seal with maximum pressure differential, thus making the valve relatively difficult to operate. In addition, in many instances it is desirable to check a valve at a station remote from the valve.

In general, it is an object of the present invention to provide simple and convenient apparatus which permits quick checking of a valve to determine if the upstream seal is leaking.

Another object of the invention is to provide novel apparatus whereby the condition of the valve with respect to leakage can be determined from a remote station.

Additional objects and features of the invention will appear from the following description in which the preferred embodiments have been set forth in detail in conjunction with the accompanying drawing.

Referring to the drawing:

FIGURE 1 is a side elevational view of valve apparatus incorporating the present invention;

FIGURE 2 is a side elevational view in section illustrating a suitable three-way vent valve for use with the apparatus of FIGURE 1;

FIGURE 3 is a schematic view illustrating apparatus which permits remote testing of a valve for leakage;

FIGURE 4 is a view like FIGURE 3 but showing another embodiment in which upstream pressure is applied to the valve body after a testing operation;

FIGURES 5A, 5B, and 5C are schematic details in section illustrating a suitable valve for use with the embodiment of FIGURE 4; and FIGURE 6 is a detail in section showing a suitable sealing assembly for use with the valve of FIGURE 1.

The apparatus shown in FIGURE 1 consists generally of a valve 10 connected to the associated piping 11. This piping represents, for example, a transmission line, or portions of a meter prover. In a typical instance the valve may be of the fabricated type with a box-like body which includes the relatively heavy end walls 12. The gate 13 may be of the slab-type provided with the port 14 which registers with the pipes 11 for full open position of the valve. Annular sealing assemblies 16 are shown carried by the end walls 12, and serve to make fluid-tight contact with the side valve working surfaces of the gate 13. The body provides a closed space 15 surrounding the gate 14.

It is assumed that the sealing assemblies 16 are of the type including a seal ring which makes sealing contact with a gate and which is also sealed with respect to the valve body. Also it is assumed that the seal rings present a fluid pressure area to differential pressure from the upstream side whereby when a substantial differential pressure exists between the upstream side and the body space, the upstream seal is urged against the gate with considerable force. Under such conditions considerable force is required to move the gate between open and closed positions, compared with the force required when the body pressure is equal to that of the upstream pressure. A seal assembly of this type which includes a seal ring made of nylon is disclosed in copending application S.N. 310,-640, filed Sept. 23, 1963, now Patent 3,293,342, and is disclosed and claimed in Patent 3,269,695.

One end of the gate 13 is connected to the valve operating rod 17, which may be engaged by suitable operating means such as an operator of the manual type, or a power operator of the hydraulic, pneumatic or electrical type.

In accordance with the present invention, we provide a small manually operated vave 18 which is connected by pipe 19 to the upstream side of the valve and by pipe fitting 21 with the inner body space of the valve. A suitable valve for this purpose is shown in FIGURE 2. It consists of a body 22 provided with the cylindrical bore 23. A sealed piston or plunger 24 is slidably fitted within bore 23 and is attached to the inner end of the operating stem 26. The exterior end of stem 26 carries the operating button 27. A compression spring 28 urges the stem 26 and the piston 24 to the limiting position shown in FIGURE 2. The body is provided with three ports or openings 29, 30 and 31. Opening 29 connects with the pipe 19 in FIGURE 1. Opening 30 connects with the pipe fitting 21, and opening 31 is open to the atmosphere.

When the button 27 is forced downwardly to the lower limiting position shown in dotted lines in FIGURE 2, openings 30 and 31 are in communication, and communication is interrupted between openings 29 and 30. However, when the piston 24 is in the position shown in solid lines in FIGURE 2, which is the position that it assumes when manual force is removed from the button 27, openings 29 and 30 are in communication, whereas communication is interrupted between openings 30 and 31.

Operation of the apparatus shown in FIGURE 1 is as follows. It is assumed that the valve 10 is in a transmission line or other piping system in which a substantial pressure is maintained. When one desires to test the valve for leakage, the valve gate is moved to closed position and the valve 18 is manually operated by depressing the button 27, whereby the piston 24 is moved to the dotted line position shown in FIGURE 2. This serves to vent the body space 15 of the valve to atmosphere through the pipe fitting 21 by virtue of free communication between openings 30 and 31. Venting of the body space immediately reduces the body space to atmospheric pressure, and this may be accompanied by a small amount of liquid discharge from opening 31. If such discharge continues, it is an indication that the upstream seal of the valve is leaking. The extent of such leakage can be roughly gauged by the amount of flow from the body space. If no continued flow of liquid occurs through the opening 31, then the upstream seal of the valve is tight, or in other words, it is properly functioning. After determining whether or not the valve is leaking, which will require ony a short interval, the operator releases the button 27 which causes the piston 24 to return to the position shown in solid lines in FIGURE 2. This serves to interrupt communication between openings 30 and 31 and to establish communication between openings 29 and 30. Therefore, the body space 15 is now in communication with the upstream side of the valve, and thus assumes the upstream pressure, thus reducing the differential pressure across the upstream sealing assembly to substantially zero. This restores the valve to such condition that the valve gate can be moved between open and closed conditions without undue effort.

Principles of the appartaus described above can be used for remote testing of valves. Thus as shown in FIGURE 3, a valve 36, similar to the valve 10, is installed at a point remote from a control station 37. An electrically operated valve 38 is installed adjacent the valve 36 and is adapted when actuated to vent the body space, and to interrupt such venting when it is not energized. A pressure switch 39 is also installed adjacent the valve 36 and has a pressure connection with the body space. This pressure switch can be any suitable type which operates electrical contacts when the pressure applied to the same exceeds a predetermined value. Circuit lines 41 and 42 extend to the control station 37. Battery 43 is representative of a suitable electrical source. The circuit lines 41 connect with the battery 43 through circuit components including the signal lamp 44 and the switch 46. Lines connect with the battery 43 through circuit components including the switch 47.

The apparatus shown in FIGURE 3 operates as follows. Assuming that an operator at the central control station wishes to determine whether or not the valve 36 is properly operating without leakage, the valve is closed as by use of remote valve operating means, after which the operator closes switch 47 to effect operation of valve 38 to vent the body space. Switch 47 is then opened to close the venting valve and then switch 46 is closed to place the signal lamp 44 under control of the pressure switch 39. If pressure builds up in the body space due to leakage past the upstream seal, the pressure switch 39 is operated to energize the signal lamp 44, thus indicating that the valve is leaking.

FIGURE 4 illustrates another embodiment somewhat similar to FIGURE 3, but in which upstream pressure is applied to the body space at the end of a test operation. In this instance the valve 36 is provided with a small supplemental vent valve 51 which has a pipe connection 52 to the body space of the valve. There is another connection 53 to the upstream side of the valve. Valve 51 can be constructed as illustrated schematically in FIGURES 5A–5C. Thus the valve body 54 is provided with a cylindrical bore 56 within which the plunger 57 is slidably fitted. This plunger is attached to the operating stem 58 which in turn is operated by some suitable motive device 59 which can be electrically energized from a remote point. The motive device may include, for example, a reversible stall type electrical motor operating the stem 58 through rack and gearing.

The valve body 54 is shown provided with three ports or openings 61, 62 and 63, and with a plurality of annular seals 65–68 which provide seals between the body and the plunger 57. Also the plunger is shown provided with a port 69. The opening 61 is connected to the pipe 53. The opening 62 is connected to pipe 52, and opening 63 can discharge to the atmosphere.

For the limiting position of the plunger 57 shown in FIGURE 5A, openings 61 and 62 are in communication and therefore pipe connections 52 and 53 are in communication to apply upstream pressure to the body space of the valve 36. When the motive device 59 is energized the plunger 57 moves from the position shown in FIGURE 5A to that shown in FIGURE 5C. When passing through the intermediate position shown in FIGURE 5B, opening 61 is out of communication with both openings 62 and 63, and openings 62 and 63 are placed in communication. Therefore at this time the upstream side of valve 36 is not in communication with the valve space, but the body space is vented to the atmosphere because of the direct communication between opnings 62 and 63. When the valve plunger 57 reaches the position shown in FIGURE 5C, communication between the openings 62 and 63 is interrupted. Therefore, venting through opening 63 is discontinued and the pressure in the body space is permitted to build up if some leakage occurs past the upstream seal.

The arrangement shown in FIGURE 4 can likewise be controlled from a remote station in substantially the same manner as in FIGURE 3. The electrical motive means 59 is shown connected with three conductor circuits 71 which can be controlled at the remote station by suitable reversing switch. A pressure switch 39 is likewise shown connected to the body space and has its circuit lines 41 extending to the remote station in the same manner as in FIGURE 3.

It will be evident that with the arrangement of FIGURE 4, when the valve 51 is operated to to test the valve 36 for leakage, the body pressure it first vented to atmosphere. Thereafter, venting of the body space is discontinued and the pressure switch 39 together with a signal lamp indicates leakage.

As indicated above, the sealing means employed may vary in different instances, but presumably includes a seal ring which is urged by differential pressure against the valve gate on the upstream side. A sealing means of this type is shown in FIGURE 6. Briefly, it consists of a ring 73 made of a material like nylon which is fixed on a rigid carrier ring 74. One side of the nylon ring 73 is provided with a softer resilient material 76 in the form of a circumferential insert. This insert may be made of a suitable synthetic rubber or elastomer having a hardness of the order of 60–80 durometer (A scale). The adjacent end wall 12 of the body is suitably machined to slidably accommodate the seal ring 73 and carrier ring 74. A plurality of circumferentially spaced coil springs 75 urge the seal ring into contact with the adjacent valve working surface of the gate 13. Suitable sealing means 77 of the resilient O-ring type provide a seal between the ring 73 and the body. The effective diameter of this seal is substantially greater than the effective diameter of the insert 76 whereby on the upstream side of the valve a fluid pressure area is provided. When pressure is applied to the upstream side of the body differential pressure is applied to the seal ring whereby the seal ring is urged by such pressure differential and also by the thrust of the springs 75 against the valve working surface of the gate.

It will be evident that the invention described above provides a convenient means for testing various valves of the system to determine if the valves are leaking. When an arrangement such as shown in FIGURES 1 and 2 is used, the valves are tested by manual operation of the valves 18. When it is desired to carry out testing from a remote point, then the arrangements of FIGURES 3 and 4 can be employed. Such arrangements can be used for testing a plurality of valves from a single remote station.

We claim:

1. In valve apparatus, a valve body having inlet and outlet openings adapted to be connected to associated piping, a valve member disposed within the body and movable between open and closed valving positions with respect to said openings, sealing means generally surrounding each of said openings, there being a closed body space within the valve body surrounding the valve member, vent valve means exterior of the body and in communication with the body space, said vent valve means being operable to vent the body space to the atmosphere, and means for indicating leakage into the body space past one of said sealing means.

2. A valve construction as in claim 1 in which the indicating means is located at a remote station and in which said remote station includes means for actuating said vent valve.

3. Apparatus as in claim 2 in which the indicating means consists of an electrical indicator at the remote station, a pressure operated switch located near the valve, the pressure operated switch having a fluid pressure connection with the space within the valve body, and electrical circuitry connecting the electrical switch with the indicator at the remote station.

4. In valve apparatus, a valve body having inlet and outlet openings adapted to be connected to associated piping, a valve member disposed within the body and movable between different valving positions with respect to said openings, sealing means generally surrounding said openings, there being a body space within the valve and surrounding the valve member, and vent valve means exterior of the valve body, the vent valve means having one fluid connection with the body space and another fluid connection to the upstream side of the valve, said vent valve in one position of the same serving to vent the body space to the atmosphere and in another position of the same serving to establish communication between the upstream side of the valve and the body space.

5. Valve apparatus as in claim 4 in which said vent valve means is operated manually and includes means for normally urging the same toward said last-named position.

6. Valve apparatus as in claim 4 together with means in communication with the body space for indicating pressure therein.

7. Apparatus as in claim 6 in which said means for indicating pressure in the valve body consists of a pressure operated electrical switch having a fluid connection with the body space, and circuitry connected to said switch and controlled by the same, said circuitry including a visual indicator.

8. Apparatus as in claim 7 in which the visual indicator is located at a station remote from the valve and in which electrical means is provided for the operation of said vent valve, said electrical means being connected with circuitry likewise controlled from said remote station.

References Cited
UNITED STATES PATENTS

| | | | |
|---|---|---|---|
| 1,959,863 | 5/1934 | Griss. | |
| 2,258,224 | 10/1941 | Sheppard | 73—49.7 |
| 3,233,616 | 2/1966 | Chieffo | 73—46 XR |
| 3,321,956 | 5/1967 | Ollivier | 73—40.5 |

DAVID SCHONBERG, *Primary Examiner.*

J. NOLTON, *Assistant Examiner.*